US011061801B1

(12) United States Patent
Beardsworth et al.

(10) Patent No.: US 11,061,801 B1
(45) Date of Patent: Jul. 13, 2021

(54) DATA LOGGER FOR A REAL-TIME ROBOTIC CONTROL SYSTEM

(71) Applicant: X Development LLC, Mountain View, CA (US)

(72) Inventors: Michael Beardsworth, San Francisco, CA (US); Marcin Krzysztof Szczodrak, Mountain View, CA (US); Gregory J. Prisament, East Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/724,939

(22) Filed: Dec. 23, 2019

(51) Int. Cl.
*G06F 11/34* (2006.01)
*B25J 9/16* (2006.01)

(52) U.S. Cl.
CPC ......... *G06F 11/3476* (2013.01); *B25J 9/1628* (2013.01); *G06F 11/3419* (2013.01); *G06F 2201/805* (2013.01); *G06F 2201/865* (2013.01)

(58) Field of Classification Search
None
See application file for complete search history.

(56) References Cited

U.S. PATENT DOCUMENTS

| 5,619,409 A * | 4/1997 | Schultz | G06F 9/4812 |
| | | | 700/17 |
| 7,376,767 B1 * | 5/2008 | Black | G06F 5/06 |
| | | | 370/466 |
| 2008/0162272 A1 * | 7/2008 | Huang | G06F 11/3409 |
| | | | 717/127 |

* cited by examiner

*Primary Examiner* — Idriss N Alrobaye
*Assistant Examiner* — Dayton Lewis-Taylor
(74) *Attorney, Agent, or Firm* — Fish & Richardson P.C.

(57) ABSTRACT

Methods, systems, and apparatus, including computer programs encoded on computer storage media, for logging real-time data of a robot control system. One of the systems comprises a real-time robotic control system comprising one or more computers, programmed to perform operations comprising i) software module loops and ii) real-time data logging, wherein each software module loop comprises a plurality of software modules executed repeatedly in a predetermined sequence, each software module executes within a predetermined time window, and the real-time data logging comprises copying segments of real-time data used by a particular software module to a buffer accessible by a non-real-time downstream system, wherein each segment of real-time data is copied at a respective predetermined time relative to execution of the software modules in the software module loop; and the non-real-time downstream system comprising one or more computers, the non-real-time downstream system programmed to perform operations that consume the real-time messages.

18 Claims, 3 Drawing Sheets

DATA LOGGER FOR A REAL-TIME ROBOTIC CONTROL SYSTEM

BACKGROUND

This specification relates to robotics, and more particularly to logging data in real-time robotic control systems.

Real-time software control systems are software systems that must execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

Such real-time software control systems are often used to control physical machines that have high precision and timing requirements. As one example, a workcell of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position.

The real-time operations are generally implemented by software module loops. Each software module loop includes multiple software modules executed in a predetermined sequence repeatedly.

The strict timing requirements of real-time software control systems make it difficult for systems to implement asynchronous commands as well as time-intensive input and output operations. This is because operations that are not directly related to the real-time operations in the software module loop place the system at risk of entering a fault state by missing a real-time deadline.

Some existing techniques enable very limited logging capabilities. For example, using existing techniques a user can select a certain variable in a real-time robotic control system and select a condition for the variable, e.g., surpassing a certain threshold value. The existing technique will then allow the user to monitor the value when the condition is met, e.g., dump all values of the variable in a ten-second window surrounding the time at which the condition was met. However, these existing techniques do not allow a user to monitor every segment of real-time data throughout the execution of the real-time robotic control system.

SUMMARY

This specification generally describes how a real-time robotic control system can log real-time data during the execution of one or more software module loops. In many implementations, a downstream system, i.e., a system that is separate from the real-time robotic control system, consumes these segments of real-time data.

For example, the downstream system can be a front-end visualizer system that processes the real-time data to generate a visualization of the current state of the real-time robotic system. This visualization can be displayed to a user, e.g., to evaluate the performance of the real-time robot system.

In a given control cycle of a software module loop, each software module executes within a predetermined time window. Therefore a schedule can be generated that specifies the times at which to copy each of the segments of real-time data.

When a user is configuring the real-time robotic control system, the user can specify the software modules that are to be executed in a given software module loop. Each software module executes according to a predetermined real-time data interface, and so the user can further specify the real-time messages that are to be exchanged between any two or more software modules in the software module loop.

The real-time robotic control system can automatically generate a schedule for copying these real-time messages to a buffer that is accessible to a downstream system; the schedule must ensure that a given message is copied to the buffer after it is finalized but before it is overwritten. The scheduled operation for copying a segment of real-time data can take a deterministic amount of time, so that the real-time robotic control system can copy the data in the time allotted by the particular schedule of the software module loop. The real-time messages can be stored in memory, accessible to those software modules that need them. Often these messages are only available in a small time window during a control cycle of the software module loop before they are overwritten.

Particular embodiments of the subject matter described in this specification can be implemented so as to realize one or more of the following advantages.

The system described in this specification allows the logging of every segment of real-time data, in part because it provides a structured model of each software module in a software module loop, where each software module has a predefined data interface that declares all segments of real-time data that the given software module sends and receives. Thus, a user can precisely define, e.g., in a configuration file when configuring the real-time robotic control system, what segments of real-time data should be logged. The real-time robotic control system can then determine, using the structured model of the software modules, a schedule that will properly log each required segment of real-time data.

The system and methods described in this specification further allow certain segments of real-time data to be flagged as "private," i.e., the flagged segment of real-time data cannot be logged and accessed by the end user or a downstream system. Traditionally, the entire stack of a real-time robotic control system can be implemented by a single vendor, i.e., the same entity manufactures the hardware, configures the device drivers, and implements every controller. In these situations, data privacy is not a big concern; an end user cannot access the real-time data, as there is no entry point. However, it has become common for different entities to provide different components of the real-time robotic control system stack, e.g., the hardware manufacturer provides device drivers, an integrator provides certain controllers, and an end user provides additional controllers. Under this regime, data privacy becomes an issue, as each entity may want to protect certain segments of real-time data that relate to proprietary information. For example, the robot manufacturer may have a trade-secret dynamic model of the robot in the device driver provided to users; if the real-time robotic control system enabled users to access all real-time data, they may be able to reverse-engineer the dynamic model with enough samples of certain segments of real-time data, e.g., commanded motor torques of the robot. The techniques described in this specification allow different entities to flag certain segments of real-time data to forbid logging, or only allow logging to specific destinations. This flagging can also be employed to ensure data privacy, e.g., ensuring that the device drivers for a camera cannot log camera data that contains private information. This allows users to ensure compliance with data privacy regulations, e.g., General Data Protection Regulation (GDPR) in the European Union.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
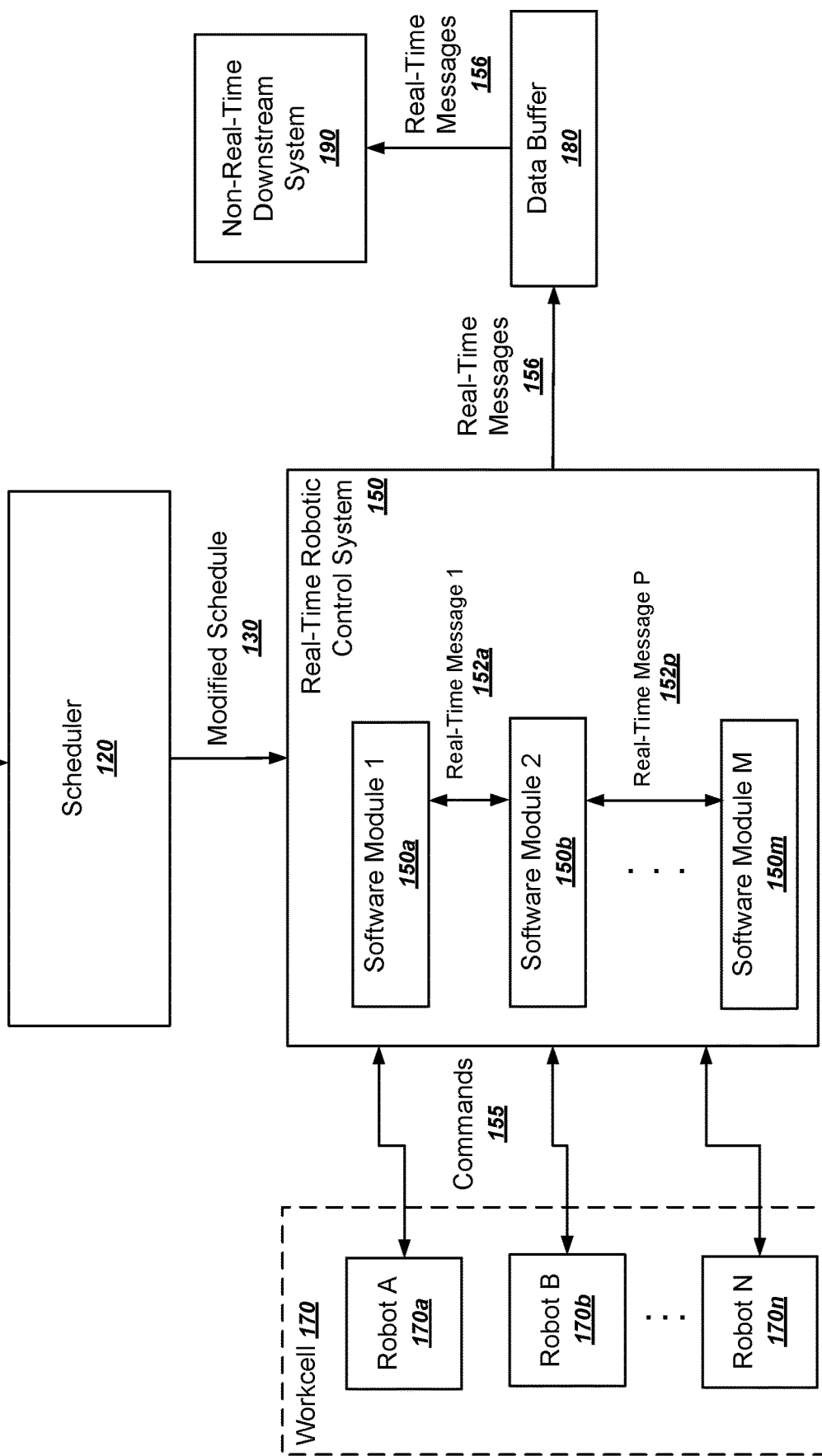
FIG. 1 is a diagram that illustrates an example system.

FIG. 1 is a diagram that illustrates an example system 100. The system 100 is an example of a system that can implement the techniques described in this specification.

The system 100 includes a number of functional components, including a scheduler 120, a real-time robotic control system 150, a data buffer 180, and a non-real-time downstream system 190. Each of these components can be implemented as computer programs installed on one or more computers in one or more locations that are coupled to each other through any appropriate communications network, e.g., an intranet or the Internet, or combination of networks. The system 100 also includes a workcell 170 that includes N robots 170a-n.

The real-time robotic control system 150 is configured to control the robots 170a-n in the workcell 170. The real-time robotic control system 150 must satisfy one or more hard time constraints in the operation of the workcell 170. For example, one of the robots in the workcell 170 may be required to perform a certain operation at regular intervals, e.g., 10 milliseconds; if the robot ever fails to execute the operation in a given time window, then the robot enters a fault state.

The real-time robotic control system 150 is composed of one or more software module loops, each of which contains multiple software modules that execute repeatedly in a predetermined sequence in order to control the robots 170a-n. For simplicity, FIG. 1 shows a single software module loop that includes M software modules 150a-m.

Each software module can have a corresponding data interface that specifies the real-time data that the software module receives as input and provides as output. During execution, the software modules exchange P real-time messages 152a-p that are required for the respective software modules to execute. For example, software module 150a can provide real-time message 152a to software module 150b, and software module 150b can provide real-time message 152p to software module 150m. The data interface for a given software module can also specify that some segments of data used by the software module are not allowed to be logged.

The overall goal of the scheduler 120 is to generate a schedule that allows the real-time robotic control system 150 to log real-time messages 156. The real-time messages 156 can include either all of the real-time messages 152a-p or a subset of the real-time messages 152a-p.

The scheduler 120 receives a configuration file 110. The configuration file 110 can be generated by a user. The configuration file 110 can specify the software module loop, including identifying the software modules 150a-m in the software module loop and the real-time messages 152a-p exchanged between the software modules. The configuration file 110 can also identify the real-time messages 156, i.e., identify which of the real-time messages 152a-p the real-time robotic control system 150 should log during execution of the software module loop.

The scheduler uses the configuration file 110 to generate a modified schedule 130 for the real-time robotic control system 150 that identifies particular times in a given control cycle of the software module loop to log real-time messages 156. This process is described in more detail below in reference to FIG. 2. In particular, if one of the real-time messages 156 has been flagged in the respective data interface so that the real-time message is disallowed from being logged, the scheduler does not schedule an operation for logging the particular real-time message.

The scheduler 120 gives the modified schedule 130 to the real-time robotic control system 150, which executes the software module loop according to the modified schedule 130. That is, the real-time robotic control system 150 executes the software modules 150a-m, causing the real-time robotic control system 150 to issue commands 155 to the workcell 170 in order to drive the movements of the robots 170a-n. While the software modules 150a-m are controlling the workcell 170, the software modules 150a-m are exchanging real-time messages 152a-p, and the real-time robotic control system 150 is logging each of the real-time messages 156 at a respective time in the software module loop according to the modified schedule 130.

In order to log the real-time messages 156, the real-time robotic control system 150 can copy the real-time messages 156 to the data buffer 180. Often, the real-time messages 152a-p that are exchanged between the software modules 150a-m are organized using flat buffers, which is a flat in-memory representations. In these cases, the real-time robotic control system 150 can serialize the real-time messages 152a-p by mem-copying the real-time messages 152a-p to the data buffer 180.

In some implementations, the real-time robotic control system 150 pre-processes the real-time messages 156 before placing them into the data buffer 180. For example, the real-time robotic control system 150 can serialize the real-time messages 156 before placing them into the data buffer 180. That is, the real-time robotic control system 150 can process the real-time messages 156 to translate them into a format that is more suitable for storing in the data buffer 180. As another example, the real-time robotic control system 150 can assign an ordering to the real-time messages 156 before placing them into the data buffer 180. For example, each of the real-time messages can have a time stamp, and the real-time robotic control system 150 can place the real-time messages 156 in the data buffer 180 so that the real-time messages 156 are ordered by timestamp in the data buffer 180. As another example, the real-time robotic control system 150 can compress the real-time messages 156 before placing them into the data buffer 180. As another example, the real-time robotic control system 150 can process the real-time messages 156 to generate new data, e.g., to generate statistics about the real-time messages 156. The real-time robotic control system 150 can place the new data in the buffer 180 as well.

The user can configure the data buffer 180 according to the number and type of the real-time messages 156 and the type of the non-real-time downstream system 190. The user must ensure that the data buffer 180 is large enough to handle the real-time messages 156 that the user specifies in the configuration file 110. In some implementations, the scheduler 120 can send a message to the user specifying the bandwidth of the real-time messages 156, so that the user can properly configure the data buffer 180.

The data buffer 180 is accessible by the non-real-time downstream system 190, so that the non-real-time downstream system can retrieve the real-time messages 156. The non-real-time downstream system 190 is a system that does not have the same scheduling constraints as the real-time robotic control system. There are many downstream systems that might require the real-time messages exchanged between software modules of the real-time robotic control system. For example, the non-real-time downstream system 190 can be configured to debug, audit, or perform preventative maintenance on the real-time robotic control system. As another example, the non-real-time downstream system 190 can be a machine learning system that receives the real-time messages as input. As a particular example, the machine learning system can include one or more machine learning models that compute correlations between the measurements encoded in the real-time messages 156, model the real-time system behavior, detect anomalies in the real-time robotic control system, and/or generate decision policies for an autonomous real-time robotic system. When the non-real-time downstream system 190 retrieves the real-time messages 156, the non-real-time downstream system 190 can release the data buffer 180 back for use by the real-time robotic control system 150.

Figure 2:
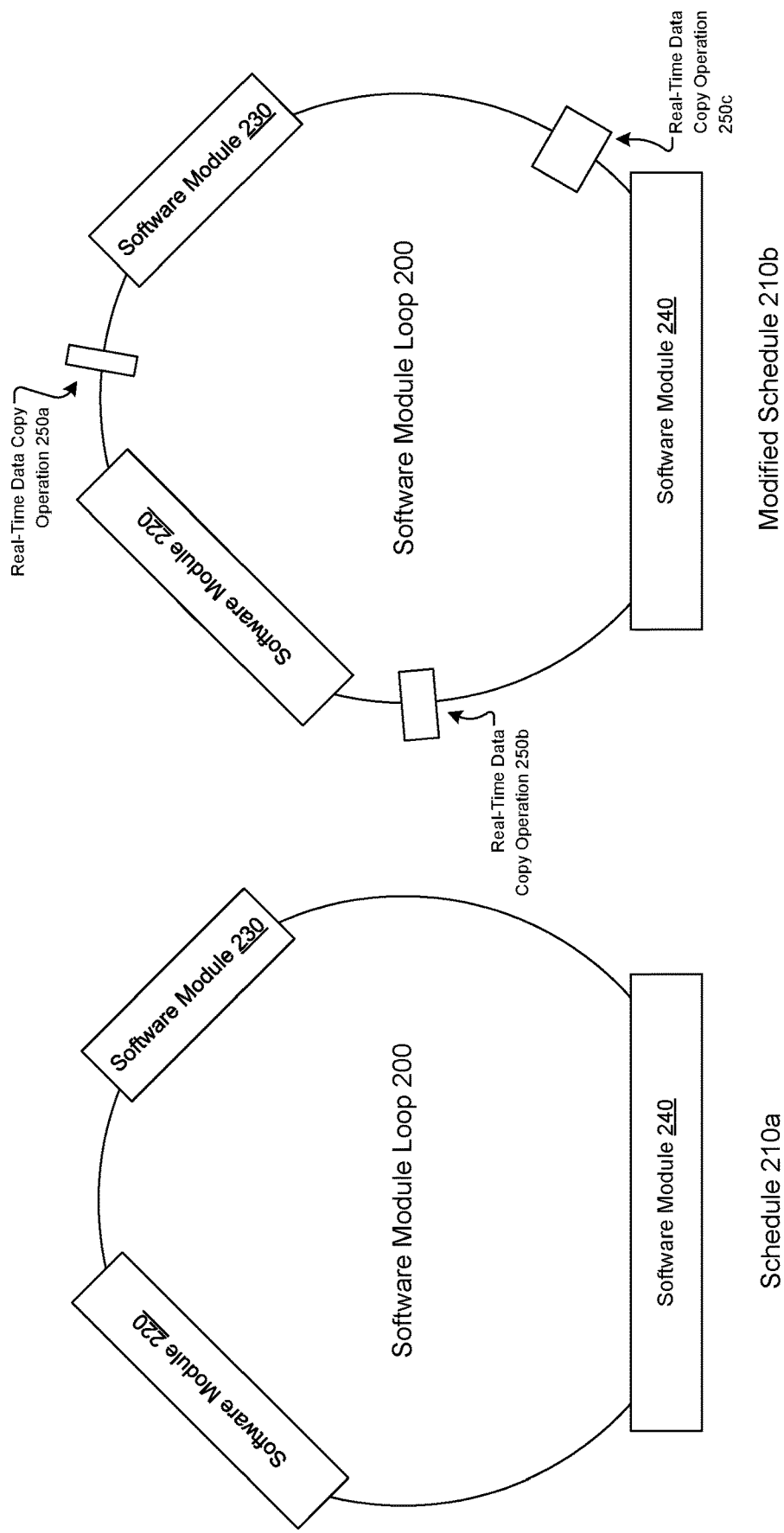
FIG. 2 illustrates an example software module loop before and after scheduling real-time data copying operations.

FIG. 2 illustrates an example software module loop 200 before and after scheduling real-time data copying operations.

The software module loop 200 includes software modules 220, 230, and 240, which execute repeatedly in a predetermined sequence in order to control one or more robots. Each of the software modules 220, 230, and 240 executes within a predetermined time window in the software module loop 200. During the execution of the software module loop 200, the software modules 220, 230, and 240 can send real-time messages to each other.

A schedule 210a characterizes the software module loop 200 without any data copying operations. A modified schedule 210b characterizes the software module loop 200 after real-time data copy operations 250a, 250b, and 250c have been scheduled. For example, a scheduler, e.g., the scheduler 120 in FIG. 1, can process data representing the schedule 210a of the software module loop 200 to generate the modified schedule 210b of the software module loop 200. To determine the modified schedule 210b, the scheduler processes data characterizing the respective predetermined time window of each of the software modules, as well as the respective data interface of each software module, and uses this information to generate the modified schedule 210b that satisfies the time constraints of the software module loop 200.

The real-time data copy operations 250a-c characterize predetermined times during the execution of the software module loop 200 that a logging system, e.g., the real-time robotic control system 150 in FIG. 1, will log respective real-time messages. The real-time messages are only available in a small time window during the software module loop 200. The scheduler selects the real-time data copying operations 250a-c so that the logging system may copy the real-time messages after they are finalized but before they are overwritten. Each of the real-time data copy operations 250a-c takes a deterministic amount of time, so that the real-time data copy operations 250a-c are guaranteed to be completed at the respective predetermined times in the software module loop 200, and thus guaranteed not to interfere with the execution of the software modules 220, 230, and 240.

Figure 3:
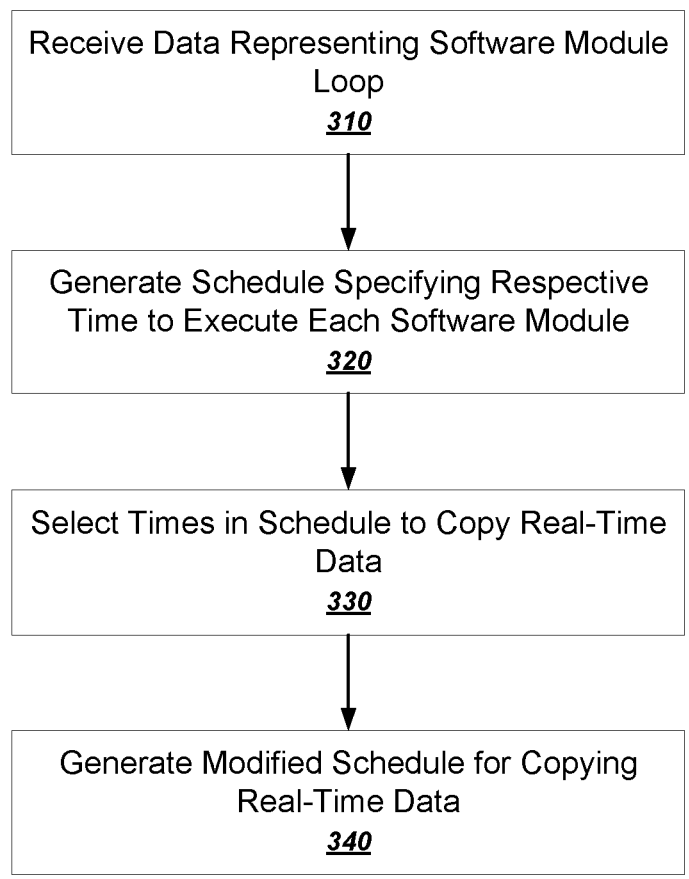
FIG. 3 is a flowchart of an example process for generating a schedule for copying real-time data.

FIG. 3 is a flowchart of an example process 300 for generating a schedule for copying real-time data. The process 300 can be implemented by one or more computer programs installed on one or more computers and programmed in accordance with this specification. For example, the process 300 can be performed by the scheduler 120 shown in FIG. 1. For convenience, the process will be described as being performed by a system of one or more computers.

The system receives data representing a software module loop (310). The software module loop includes multiple software modules executed repeatedly in a predetermined sequence in order to control one or more robots.

The system generates a schedule specifying respective times to execute each of the software modules (320). The system generates the schedule according to one or more real-time constrains of the one or more robots. For example, the software module loop may need to execute a control cycle every 10 milliseconds or else the one or more robots will enter a fault state.

The system selects times in the schedule to copy one or more segments of real-time data (330). The segments of real-time data are used by the software modules during their execution to control the one or more robots.

The system generates a modified schedule for copying the one or more segments of real-time data (340). When executed by a real-time robotic control system, e.g., the real-time robotic control system 150 in FIG. 1, the real-time robotic control system copies the segments of real-time data to a buffer that is accessible by a non-real-time downstream system, e.g., the non-real-time downstream system 190 in FIG. 1. Each of the operations for copying a respective segments of real-time data can take a deterministic amount of time to execute. Thus, the modified schedule can ensure that the operations for copying the real-time data do not interfere with the software modules in the controlling of the one or more robots. For example, the modified schedule could include a single operation for copying every segment of real-time data at the end of a control cycle of the software module loop, or the modified schedule could include multiple intermediate operations for copying certain segments of real-time data throughout a control cycle of the software module loop.

In some implementations, the system generates the modified schedule by performing a topological sort on the software modules and the operations for copying segments of real-time data. That is, the system determines an ordering of the software modules in the software module loop, as well as a time at which each segment of real-time data that needs to be copied becomes available, and generates an ordering of the software modules and copy operations such that a system could consecutively execute each item in the ordering. In some other implementations, the system assigns each software module and copy operation to a particular thread of multiple threads, such that some software modules and copy operations can be executed in parallel.

In some implementations, the modified schedule can instruct the real-time robotic control system to copy the real-time data to multiple locations. As a particular example, the modified schedule may identify particular segments of real-time data that should be copied to a first buffer that is accessible by a debugging downstream system, and other particular segments of real-time data that should be copied to a second buffer that is accessible by a front-end visualizer system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a system comprising:
a real-time robotic control system comprising one or more computers, the real-time robotic control system programmed to perform operations comprising i) one or more software module loops and ii) real-time data logging, wherein:
each software module loop comprises a plurality of software modules executed repeatedly in a predetermined sequence,
each software module executes within a predetermined time window, and
the real-time data logging comprises copying one or more segments of real-time data used by a particular software module to a buffer accessible by a non-real-time downstream system, wherein each segment of real-time data is copied at a respective predetermined time relative to execution of the software modules in the software module loop; and
the non-real-time downstream system comprising one or more computers, the non-real-time downstream system programmed to perform operations that consume the one or more real-time messages.

Embodiment 2 is the system of embodiment 1, wherein:
each software module executes according to a predefined data interface,
each software module exchanges real-time messages with one or more other software modules according to the respective predefined data interfaces, and
the one or more segments of real-time data comprise one or more real-time messages exchanged between respective software modules.

Embodiment 3 is the system of any one of embodiments 1-2, wherein copying a respective segment of real-time data used by a particular software module takes a predetermined amount of time.

Embodiment 4 is the system of any one of embodiments 1-3, wherein copying one or more segments of real-time data comprises accessing a configuration file that specifies the one or more segments of real-time data.

Embodiment 5 is the system of any one of embodiments 1-4, wherein copying one or more segments of real-time data comprises accessing a configuration file that specifies one or more disallowed segments of real-time data, and copying segments of real-time data that are not disallowed by the configuration file.

Embodiment 6 is the system of any one of embodiments 1-5, wherein the real-time logging further comprises processing the one or more segments of real-time data, and inserting the one or more segments of processed real-time data into the buffer accessible by the non-real-time downstream system.

Embodiment 7 is the system of any one of embodiments 1-6, wherein copying the one or more segments of real-time data to a buffer comprises serializing the segments of real-time data in the buffer.

Embodiment 8 is the system of any one of embodiments 1-7, wherein real-time data logging further comprises configuring a size of the buffer accessible by the non-real-time downstream system.

Embodiment 9 is the system of any one of embodiments 1-8, wherein copying one or more segments of real-time data to a buffer comprises selecting a respective location in the buffer for each segment of real-time data to be copied.

Embodiment 10 is the system of any one of embodiments 1-9, wherein the non-real-time downstream system comprises one or more of a debugging system, an analytics system, an auditing system, a preventative maintenance system, or a machine learning system.

Embodiment 11 is a method for configuring an instance of a real-time robotic control system, the method comprising:
receiving data representing a software module loop, wherein the software module loop comprises a plurality of software modules executed repeatedly in a predetermined sequence to control one or more robots;
generating a schedule that specifies a respective time at which to execute each software module in the software module loop according to one or more real-time constraints of the one or more robots;
selecting, within the schedule, respective times to copy one or more segments of real-time data used by a particular software module, relative to execution of other software modules in the software module loop; and
generating a modified schedule that when executed by the real-time robotic control system of the robot causes the real-time robotic control system to perform operations comprising copying the segments of real-time data to a buffer accessible by a non-real-time downstream system.

Embodiment 12 is the method of embodiment 11, wherein:
receiving data representing a software module loop comprises receiving data representing a respective data interface for each of the software modules in the software module loop, wherein each data interface specifies real-time messages exchanged between the respective software module and other software modules in the software module loop; and the one or more segments of real-time data comprise one or more real-time messages exchanged between respective software modules.

Embodiment 13 is the method of any one of embodiments 11-12, wherein copying a respective segment of real-time data used by a particular software module takes a predetermined amount of time.

Embodiment 14 is the method of any one of embodiments 11-13, wherein copying one or more segments of real-time data comprises accessing a configuration file that specifies the one or more segments of real-time data.

Embodiment 15 is the method of any one of embodiments 11-14, wherein copying one or more segments of real-time data comprises accessing a configuration file that specifies one or more disallowed segments of real-time data, and copying segments of real-time data that are not disallowed by the configuration file.

Embodiment 16 is the method of any one of embodiments 11-15, wherein copying the segments of real-time data to a buffer accessible by a non-real-time downstream system comprises processing the segments of real-time data, and inserting the segments of processed real-time data into the buffer accessible by the non-real-time downstream system.

Embodiment 17 is the method of any one of embodiments 11-16, wherein copying the segments of real-time data to a buffer comprises serializing the segments of real-time data in the buffer.

Embodiment 18 is the method of any one of embodiments 11-17, further comprising configuring a size of the buffer accessible by the non-real-time downstream system.

Embodiment 19 is the method of any one of embodiments 11-18, wherein copying the segments of real-time data to a buffer comprises selecting a respective location in the buffer for each segment of real-time data to be copied.

Embodiment 20 is a computer storage medium encoded with a computer program, the program comprising instructions that are operable, when executed by data processing apparatus, to cause the data processing apparatus to perform the method of any one of embodiments 11 to 19.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
    a real-time robotic control system comprising one or more computers, the real-time robotic control system programmed to perform operations comprising i) one or more software module loops and ii) real-time data logging, wherein:
    each software module loop comprises a plurality of software modules executed repeatedly in a predetermined sequence,
    each software module executes within a predetermined time window, and
    the real-time data logging comprises accessing a configuration file that specifies one or more disallowed segments of real time data, and copying one or more segments of the real-time data used by a particular software module that are not disallowed by the configuration file to a buffer accessible by a non-real-time downstream system, wherein each segment of real-time data is copied at a respective predetermined time relative to execution of the software modules in the software module loop; and
    the non-real-time downstream system comprising one or more computers, the non-real-time downstream system programmed to perform operations that consume the one or more real-time messages.

2. The system of claim 1, wherein:
    each software module executes according to a predefined data interface,
    each software module exchanges real-time messages with one or more other software modules according to the respective predefined data interfaces, and
    the one or more segments of real-time data comprise one or more real-time messages exchanged between respective software modules.

3. The system of claim 1, wherein copying a respective segment of real-time data used by a particular software module takes a predetermined amount of time.

4. The system of claim 1, wherein copying one or more segments of real-time data comprises accessing a configuration file that specifies the one or more segments of real-time data.

5. The system of claim 1, wherein the real-time logging further comprises:
    processing the one or more segments of real-time data, and
    inserting the one or more segments of processed real-time data into the buffer accessible by the non-real-time downstream system.

6. The system of claim 1, wherein copying the one or more segments of real-time data to a buffer comprises serializing the segments of real-time data in the buffer.

7. The system of claim 1, wherein real-time data logging further comprises configuring a size of the buffer accessible by the non-real-time downstream system.

8. The system of claim 1, wherein copying one or more segments of real-time data to a buffer comprises selecting a respective location in the buffer for each segment of real-time data to be copied.

9. The system of claim 1, wherein the non-real-time downstream system comprises one or more of:
- a debugging system,
- an analytics system,
- an auditing system,
- a preventative maintenance system, or
- a machine learning system.

10. A method for configuring an instance of a real-time robotic control system, the method comprising:
- receiving data representing a software module loop, wherein the software module loop comprises a plurality of software modules executed repeatedly in a predetermined sequence to control one or more robots;
- generating a schedule that specifies a respective time at which to execute each software module in the software module loop according to one or more real-time constraints of the one or more robots;
- selecting, within the schedule, respective times to copy one or more segments of real-time data used by a particular software module, relative to execution of other software modules in the software module loop; and
- generating a modified schedule that when executed by the real-time robotic control system causes the real-time robotic control system to perform operations comprising accessing a configuration file that specifies one or more disallowed segments of real-time data, and copying the segments of the real-time data that are not disallowed by the configuration file to a buffer accessible by a non-real-time downstream system.

11. The method of claim 10, wherein:
- receiving data representing a software module loop comprises receiving data representing a respective data interface for each of the software modules in the software module loop, wherein each data interface specifies real-time messages exchanged between the respective software module and other software modules in the software module loop; and
- the one or more segments of real-time data comprise one or more real-time messages exchanged between respective software modules.

12. The method of claim 10, wherein copying a respective segment of real-time data used by a particular software module takes a predetermined amount of time.

13. The method of claim 10, wherein copying one or more segments of real-time data comprises accessing a configuration file that specifies the one or more segments of real-time data.

14. The method of claim 10, wherein copying the segments of real-time data to a buffer accessible by a non-real-time downstream system comprises:
- processing the segments of real-time data, and
- inserting the segments of processed real-time data into the buffer accessible by the non-real-time downstream system.

15. The method of claim 10, wherein copying the segments of real-time data to a buffer comprises serializing the segments of real-time data in the buffer.

16. The method of claim 10, further comprising configuring a size of the buffer accessible by the non-real-time downstream system.

17. The method of claim 10, wherein copying the segments of real-time data to a buffer comprises selecting a respective location in the buffer for each segment of real-time data to be copied.

18. One or more non-transitory computer storage media encoded with computer program instructions that when executed by a plurality of computers cause the plurality of computers to perform operations comprising:
- receiving data representing a software module loop, wherein the software module loop comprises a plurality of software modules executed repeatedly in a predetermined sequence to control one or more robots;
- generating a schedule that specifies a respective time at which to execute each software module in the software module loop according to one or more real-time constraints of the one or more robots;
- selecting, within the schedule, respective times to copy one or more segments of real-time data used by a particular software module, relative to execution of other software modules in the software module loop; and
- generating a modified schedule that when executed by the real-time robotic control system causes the real-time robotic control system to perform operations comprising accessing a configuration file that specifies one or more disallowed segments of real-time data, and copying the segments of the real-time data that are not disallowed by the configuration file to a buffer accessible by a non-real-time downstream system.

* * * * *